(No Model.)  3 Sheets—Sheet 1.
H. J. ANDERSON.
BUTTER WORKER.
No. 444,270. Patented Jan. 6, 1891.
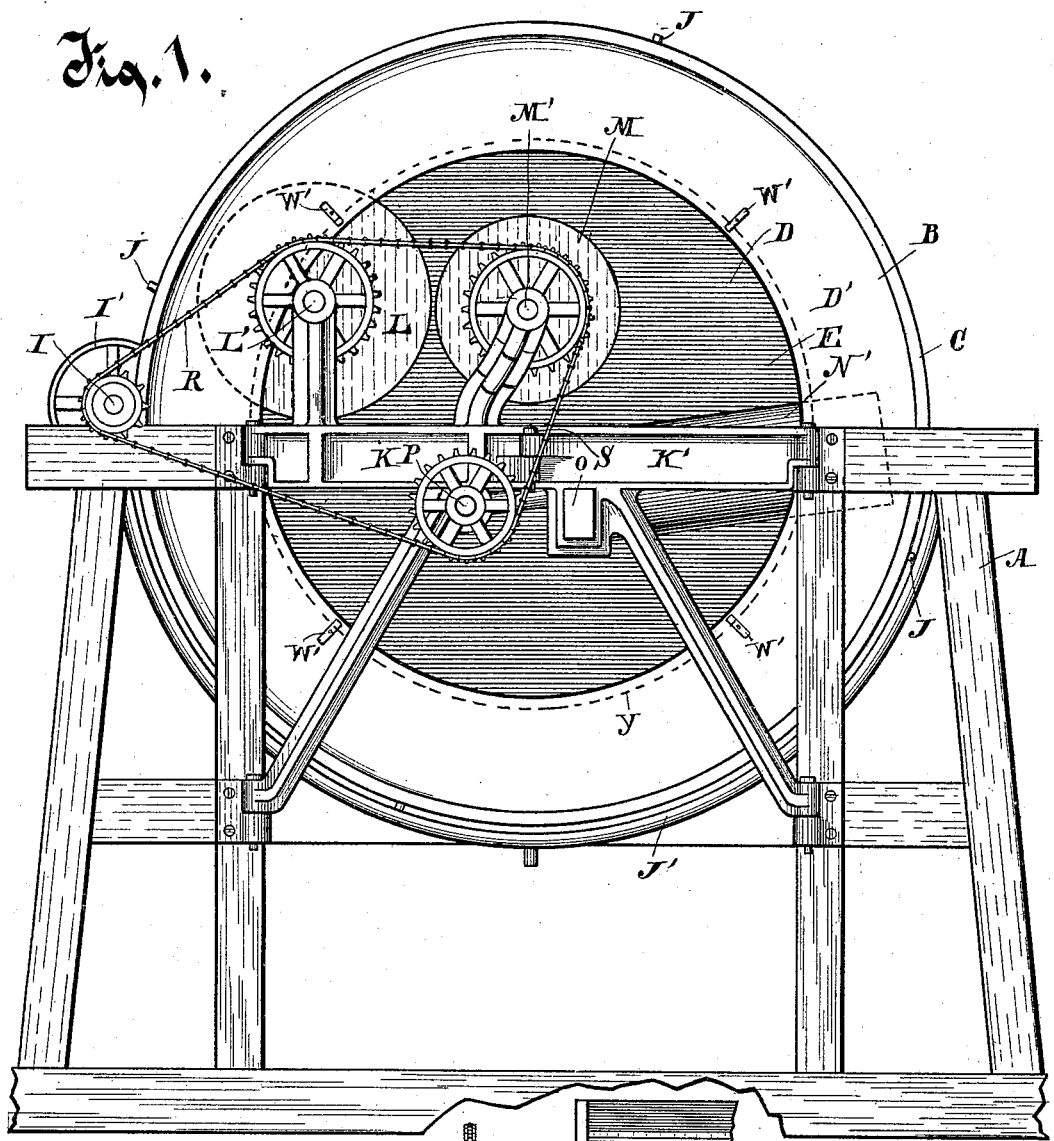
Witnesses.
Inventor.
Attorneys.

(No Model.) 3 Sheets—Sheet 2.
H. J. ANDERSON.
BUTTER WORKER.
No. 444,270. Patented Jan. 6, 1891.
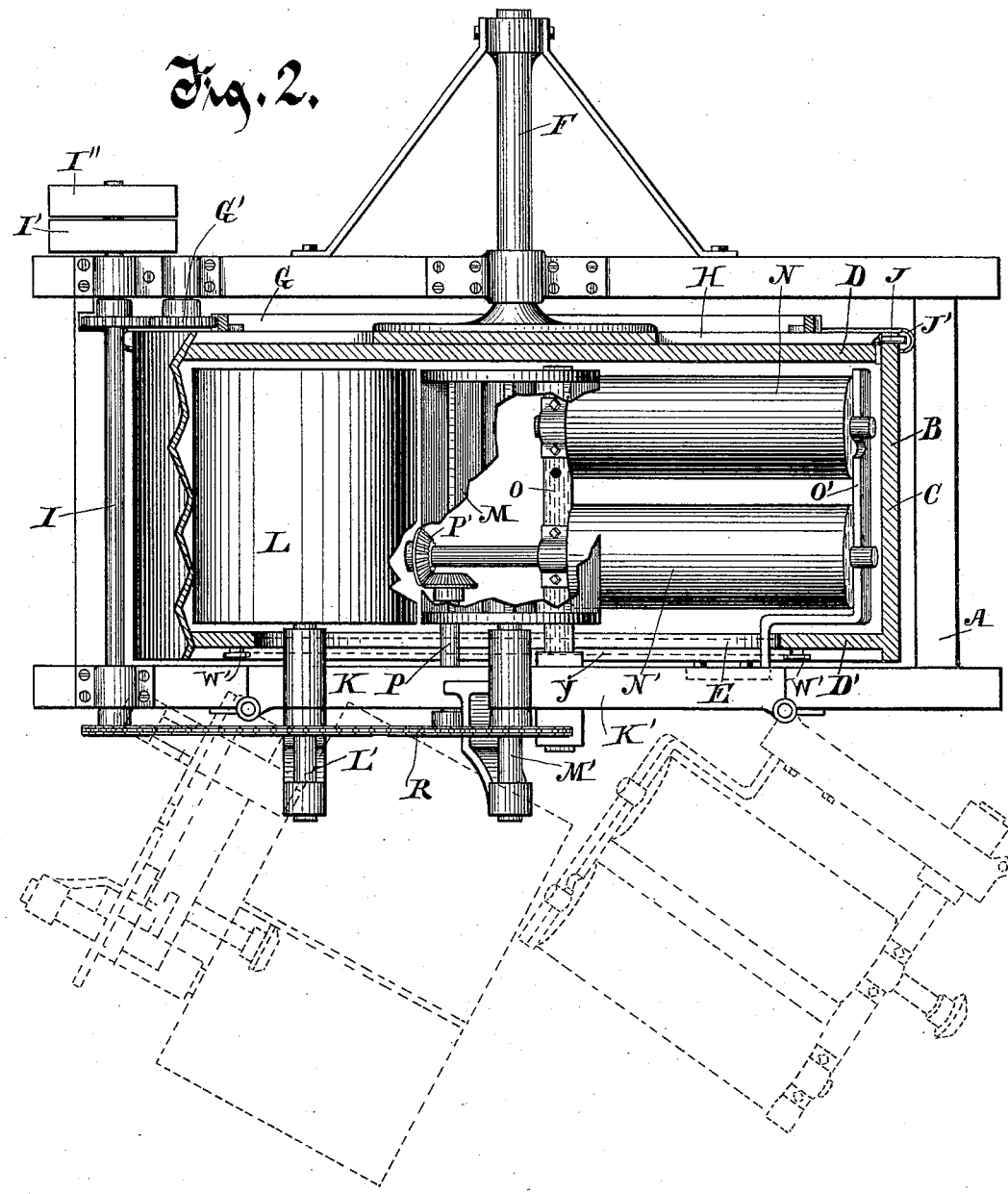
Witnesses.
O. N. Kinney
Anna Faust
Inventor,
Hans J. Anderson
by Ervin J. Benedict
Attorneys.

(No Model.) 3 Sheets—Sheet 3.
H. J. ANDERSON.
BUTTER WORKER.
No. 444,270. Patented Jan. 6, 1891.
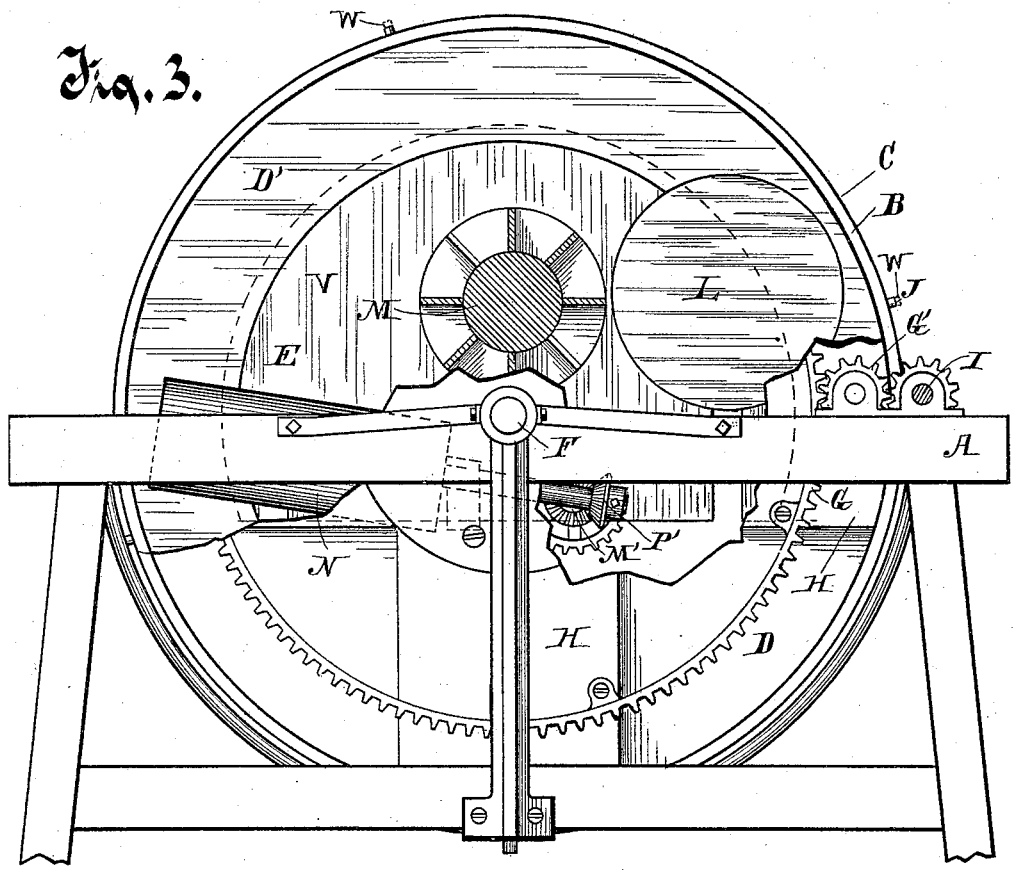
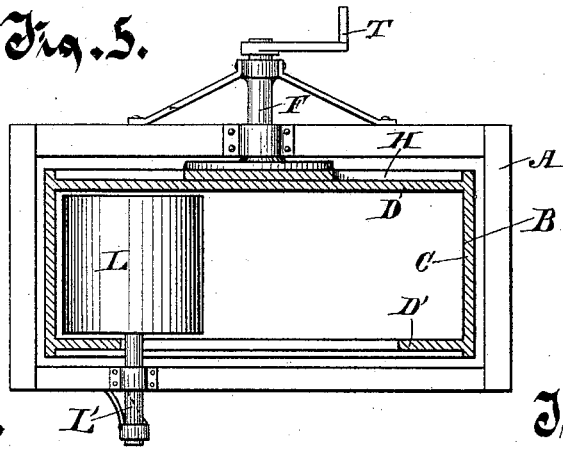
Witnesses. Inventor.
Hans J. Anderson

UNITED STATES PATENT OFFICE.

HANS J. ANDERSON, OF LAKE MILLS, WISCONSIN.

BUTTER-WORKER.

SPECIFICATION forming part of Letters Patent No. 444,270, dated January 6, 1891.

Application filed April 3, 1890. Serial No. 346,368. (No model.)

*To all whom it may concern:*

Be it known that I, HANS J. ANDERSON, of Lake Mills, in the county of Jefferson and State of Wisconsin, have invented a new and useful Churn and Butter-Worker; and I do hereby declare the following to be a full, clear, and exact description of said invention, reference being had to the accompanying drawings, and to the letters of reference marked thereon, which form a part of this specification.

My improved device is especially adapted for use at creameries, where large quantities of cream are churned and large masses of butter are worked, and where the mechanism is usually driven by steam-power.

The object of my invention is to provide a device in which cream may be churned and a mass of butter may be automatically worked, the butter being squeezed or pressed together, flattening it out, and turned and pressed in a transverse direction, carrying on this alternating process successively until the milk and water are entirely removed from the butter, the device being so constructed as not to crush the globules of which the butter is formed, thereby preserving the consistency and quality of the butter.

In the drawings, Figure 1 is a side elevation of the complete device. Fig. 2 is a top plan view of the device, parts being broken away to show the interior construction, a second position of some parts and other removable parts being shown in dotted lines. Fig. 3 is a rear elevation of the device, parts being broken away to show interior construction. Fig. 4 is a detail of supporting and operating mechanism. Fig. 5 is a top plan view of a modified form of the device, parts being in section to show interior parts.

A is the supporting-frame. The receptacle or drum B consists of the short hollow cylinder C, having a complete rigid head D in one end and a rigid head D' in the other end, which head D' has a central aperture E, of considerable size, for the free introduction and removal of the material to be operated on to and from the drum for the introduction of operative mechanism into the drum. The drum is provided with a spindle or arbor F, affixed rigidly centrally to the head D, which arbor has its journal-bearings in the frame A. The drum is also provided with a spur toothed rim G, secured rigidly to the head D, being fastened directly to re-enforcing pieces H, which are placed against and affixed to the head D. The rim G meshes with a gear-wheel G', which meshes with a pinion on the driving-shaft I. The driving-shaft I has its journal-bearings in the frame, and is provided with fast and loose pulleys I' and I'' for carrying a belt thereon running from the power-supplying mechanims. The drum is thus adapted to revolve, but at a comparatively low rate of speed. The cylinder is provided with a series of apertures J J, which are adapted as the cylinder rotates to discharge the milk or water from the drum into the semicircular trough J', from which it is discharged through an aperture at its lowest point.

Two swinging arms K K', hinged on the frame, are adapted to support the rollers and mechanism for working the butter, which when in use are within the drum B, but which may be swung out of and away from the drum, in the manner indicated in dotted lines in Fig. 2, for the convenience of the operator in putting the butter into the drum or removing it therefrom and for the purpose of washing the rollers and related mechanism. A roller L, provided with an arbor L', is supported revolubly by its arbor in elongated bearings on a post on the arm K, being arranged normally within the drum B at a little distance from and parallel to the cylinder C and preferably somewhat above the plane of the axis of the drum. A corrugated or longitudinally-ribbed roller M, having a rigid arbor M', is supported revolubly by its arbor in elongated bearings on a post on the arm K, which roller M is located normally near to and parallel with the roller L, and so as to take therefrom the butter that passes over the roller L, carrying it forward to the other rollers, hereinafter to be described. Two other rollers N and N', located normally in the drum and on the side opposite to the roller L, are arranged at right angles to the drum and to the roller L. These rollers N and N' are provided with fixed axles, which have their journal-bearings in arms O and O', rigid in the swinging arm K'. These rollers are arranged parallel to each other and at a little distance apart, the roller N being adjustable through its bearings in the arms O and O' toward and from the roller N'. The adjustment of the roller N on the arms O and O' is provided for in the construction shown in the drawings by having the journal-box on the arm O movable along the arm O and by providing two or more sockets in the arm O' for receiving the axle of the roller therein. The axle of the roller N' is provided with a pinion P', meshing, when the mechanism is in the normal position shown in Fig. 2, with a pinion on the shaft P, having its bearings in the arm K. The rollers N and N' are preferably arranged at a slightly-downward inclination toward their inner ends, as shown in Figs. 1 and 3. A sprocket-chain R, running on wheels on the shafts I and P and on the arbors L' and M', rotates the rollers L, M, and N' when the shaft I is in motion.

It will be understood that when this device is in use the mass of butter in the drum will, as the drum revolves in the direction shown by the arrow in Fig. 1, be carried up the side of the drum and will pass between the side of the drum and the roller L, whereby it will be pressed and flattened to a certain extent and will pass over the roller L onto the roller M, by which it will be carried forward and dropped down upon and between the rollers N and N', between which it will pass, being thereby compressed in a transverse direction, and will then fall onto the cylinder at the bottom to be again carried up around and over the roller L, repeating the process until the milk and water shall be entirely removed from the butter, the milk and water in the meantime passing out through the apertures J into the trough J'. When the butter has been sufficiently worked, the pin S, which secures the swinging ends of the arms K and K' together when the butter-worker is in use, is removed, and the arms K and K' are swung outwardly, carrying with them the rollers and related mechanism within the drum, so that the butter may be readily removed therefrom and the rollers can be conveniently cleansed. As the arm K is swung outwardly the sprocket-chain R can, if preferred, be removed from its wheels. If found desirable, a half cover or apron V may be put over the upper part of the aperture E, as shown and indicated by dotted lines in Fig. 3.

In working small quantities of butter a modified form of my mechanism, such as I have shown in Fig. 5, may be used. The arbor F of the drum B may be provided with a crank-handle T for rotating it. The roller L may have its arbor supported in bearings fixed on the frame, and being unconnected to any mechanism for driving it is merely an idle pressure-roller. Butter being placed in the drum and it being rotated in the proper direction by the handle T, the butter will be carried up its side along between the drum and the roller L, whereby it will be pressed to a certain extent and will be carried over the roller and fall onto the bottom of the cylinder, to be again carried up between it and the rollers L, as before. This process may be continued until the butter shall be sufficiently worked.

To convert the device into a churn, the arms K and K' are swung outwardly, thereby removing the rollers from the drum in the manner shown in dotted lines in Fig. 2. The apertures J J are closed by stoppers W W, (indicated in dotted lines in Fig. 3,) and a cover Y (indicated in dotted lines in Fig. 1) is placed over the aperture E and secured to the head D' by the swinging buttons W' W'.

The cream may when the quantity is small be placed in the drum before the cover Y is secured thereto; but the cover is preferably provided with an apperture therefor arranged to be closed by a stopper or small cover.

What I claim as new, and desire to secure by Letters Patent, is—

1. A butter-worker consisting of a hollow cylindrical revolving drum and rollers therein arranged in two sets at right angles to each other, the rollers being provided with mechanism for rotating them, substantially as described.

2. In a butter-worker, a revolving cylindrical drum and a pressure-roller supported therein and having its axis parallel with the axis of the drum, in combination with two other pressure-rollers located within the drum and arranged at right angles to the axis of the drum, substantially as described.

3. In a butter-worker, the combination, with a hollow cylindrical revolving drum, of a pressure-roller located within the drum, having its axis parallel with the axis of the drum, a pair of pressure-rollers located within the drum at right angles to the drum and first roller, and a roller-conveyer located between the single pressure-roller and the pair of pressure-rollers, the roller-conveyer being adapted to carry the butter from the single pressure-roller to the pair of rollers, substantially as described.

4. In a butter-worker, a drum supported and revoluble on a spindle affixed to one head thereof, in combination with a single pressure-roller supported by its arbor on a swinging arm and arranged to rotate within the drum, its axis being parallel to the axis of the drum, and a pair of rollers supported on another swinging arm and arranged to rotate within the drum parallel to each other and at right angles to the axis of the drum, substantially as described.

5. In a butter-worker having a revolving cylindrical drum provided with an aperture of considerable size through one of its heads, the combination, with a swinging arm located in front of the aperture in the head of the drum and rollers supported thereon, having their axes normally parallel with the axis of the drum, of another swinging arm located opposite the first arm and rollers supported thereon and arranged normally at right angles to the axis of the drum and to the axis of the rollers on the first arm, and mechanism, substantially as described, for operating the rollers when in their normal position within the drum, as set forth.

6. The combination, in a churn and butter-worker, of a revoluble drum having an aperture of considerable size in one head thereof, with swinging arms located in front of the aperture and carrying thereon rollers for working the butter, which rollers may be swung into or out of the drum through the aperture in the head thereof, substantially as described.

In testimony whereof I affix my signature in presence of two witnesses.

HANS J. ANDERSON.

Witnesses:
C. B. MILLS,
W. L. HOSKINS.